(12) United States Patent
Nakamichi

(10) Patent No.: US 6,788,932 B2
(45) Date of Patent: Sep. 7, 2004

(54) DATA COMMUNICATION SYSTEM UTILIZING A CELLULAR PHONE

(75) Inventor: Yasuhiro Nakamichi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 440 days.

(21) Appl. No.: 09/867,397

(22) Filed: May 31, 2001

(65) Prior Publication Data

US 2002/0004388 A1 Jan. 10, 2002

(30) Foreign Application Priority Data

Jul. 10, 2000 (JP) ........................................ 2000-208716

(51) Int. Cl.[7] .............................................. H04Q 7/20
(52) U.S. Cl. .................... 455/422; 455/423; 455/426.1; 455/552.1; 714/758; 714/776
(58) Field of Search ............................. 455/422.1, 423, 455/425, 426.1, 426.2, 428, 456.5, 550.1, 552.1, 554.2, 556.1, 561, 566, 560, 517; 714/758, 776

(56) References Cited

U.S. PATENT DOCUMENTS

| | | | | |
|---|---|---|---|---|
| 5,031,179 A | * | 7/1991 | Yoshida et al. | 714/748 |
| 5,991,639 A | * | 11/1999 | Rautiola et al. | 455/414.1 |
| 6,038,224 A | * | 3/2000 | Kim et al. | 370/342 |
| 6,052,565 A | * | 4/2000 | Ishikura et al. | 455/67.11 |
| 6,061,820 A | * | 5/2000 | Nakakita et al. | 714/776 |
| 6,198,920 B1 | * | 3/2001 | Doviak et al. | 455/426.1 |
| 6,289,037 B1 | * | 9/2001 | Gibbons et al. | 375/130 |
| 6,292,516 B1 | * | 9/2001 | Petsko et al. | 375/267 |
| 6,320,852 B1 | * | 11/2001 | Obuchi et al. | 455/553 |
| 6,438,119 B1 | * | 8/2002 | Kim et al. | 714/758 |
| 6,526,288 B1 | * | 2/2003 | Khalifa et al. | 455/557 |
| 6,587,672 B1 | * | 7/2003 | Chuah et al. | 455/69 |
| 6,678,502 B1 | * | 1/2004 | Sugaya et al. | 455/74.1 |

FOREIGN PATENT DOCUMENTS

| | | |
|---|---|---|
| JP | A10340064 | 12/1998 |
| JP | A113072 | 1/1999 |

* cited by examiner

Primary Examiner—William Trost
Assistant Examiner—Joseph D Nguyen
(74) Attorney, Agent, or Firm—Birch, Stewart, Kolasch & Birch, LLP

(57) ABSTRACT

A data communication system utilizing a cellular phone is composed of a radio base station, a cellular phone having a function of connecting to a network through radio communications with the radio base station to make data communications accompanied by error control using a CRC code, and a terminal connecting to the network by using the data communication function of the cellular phone to make data communications, wherein, when a message frame which is an error frame having a different CRC code is received from the radio base station, the cellular phone takes out and stores the data contained in the message frame and reproduces the thus stored data to output the data.

11 Claims, 6 Drawing Sheets

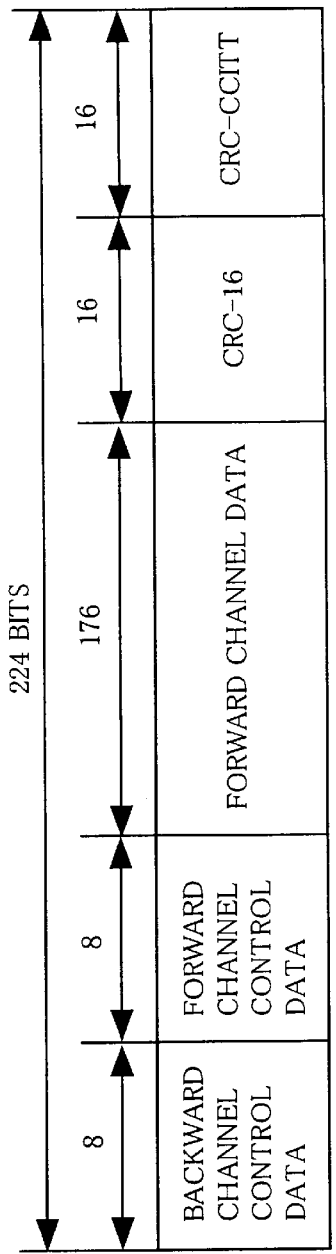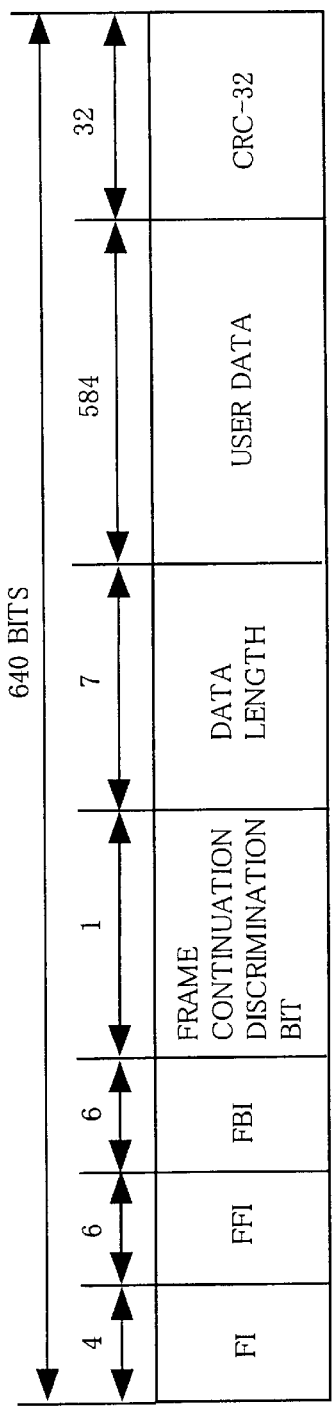

FIG. 4

| ARQ CONTROL DATA | DATA | CRC |

FIG. 5

| ARQ CONTROL DATA | DATA | CRC INVERTED |

FIG. 6

| KIND OF DATA | DATA LENGTH 1 | DATA 1 | DATA LENGTH 2 | DATA 2 | ... |

| ... | DATA LENGTH n | DATA n | END OF DATA |

DATA COMMUNICATION SYSTEM UTILIZING A CELLULAR PHONE

CROSS-REFERENCE TO RELATED APPLICATION

This application is related to Japanese Patent Application No. 2000-208716 filed in Jul. 10, 2000, whose priority is claimed under 35 USC §119, the disclosure of which is incorporated by reference in its entirety.

BACKGROUND OF THE INVENTION

1. Field of the Invention

This invention relates to a data communication system utilizing a cellular phone. More specifically, this invention relates to a data communication system utilizing a cellular phone allowed for delivering data such as advertisement by transmitting data to the cellular phone using error frames, and displaying messages such as characters on a liquid crystal screen of the body of the cellular phone.

2. Description of the Related Art

In a data communication system using a cellular phone (PDC (personal digital cellular) system of digital cellular phone) and in the PIAFS of PHS (PHS internet access forum standard), reliability in data communications has been enhanced by controlling error in the ARQ (automatic repeat request) system. That is, the data is divided into frames, and is exchanged by attaching a CRC code for correcting error to every frame. When an error is detected by a CRC code, the receiving side requests the transmission again, and a frame in which error has occurred is transmitted again to correct the error thereby to realize the data communication without become garbled of data.

Owing to these technologies compounded by the widespread proliferation of cellular data equipment such as modern cellular phones, mini-notebook personal computers and PDAs (personal digital assistant), the internet is becoming more easily accessible through the use of cellular data equipment by utilizing the data communication function of the cellular phone.

A method of delivering data such as advertisement by utilizing data communication through the cellular phone has been taught in, for example, Japanese Patent Laid-Open No. 340064/1998. According to this prior art, a large display device equipped with a cellular phone is installed on the rooftop of a building in an attempt to display chiefly advertisement, and picture signals are transmitted to the cellular phone through a wireless circuit in order to change or control the content displayed on the display device from a remote site (this is hereinafter referred to as first prior art).

According to technology disclosed in Japanese Patent Laid-Open No. 3072/1999, there is utilized a waiting time (e.g., a time of authentication in making a connection to the server of an internet service provider and a time for transferring data until a page www is read in) that occurs in making an access to a page www (world wide web) of the internet using high speed communications service such as the PlAFS of PHS, in order to display advertisement data down-loaded in advance from the advertisement data server during the waiting time (this is hereinafter referred to as second prior art).

The first prior art is suited for displaying advertisement like a signboard for a indefinite number of persons, but is not suited for delivering data such as advertisement for individual persons who own cellular phones. When the first prior art is applied to individual persons, the data must be sent from the delivery side by calling the individual's cellular phones. In case the data are sent to the cellular phones that do not meet the system, it is not possible on the side of the cellular phone to make a distinction from the normal call, and it is expected that inconvenience may occur.

According to the second prior art, it is necessary to use a special tag for specifying the reading of advertisement on a page www. This cannot guarantee the operation in a browser which does not meet the special tag. When access is made by using an ordinary personal computer to a page that uses this special tag, therefore, it is likely to cause malfunction.

Further, the advertisement data are down-loaded while other data are not being communicated. Depending upon the cases, therefore, there may exist no timing for down-loading the advertisement data, and the advertisement may not often be displayed. Further, since the advertisement is displayed during the waiting time produced during the communication, the advertisement data are not often displayed when there is produced no waiting time even though the data may have been down-loaded from the advertisement data server. This is a serious problem from the standpoint of an advertisement medium. That is, even though the data may have been down-loaded from the advertisement data server, there is no guarantee whether the data are displayed on the client side, which may arouse a problem in collecting the advertisement fees.

SUMMARY OF THE INVENTION

This invention provides a data communication system utilizing a cellular phone, comprising a radio base station, a cellular phone having a function connecting to a network through radio communications with the radio base station to make data communications accompanied by error control using a CRC code, and a terminal connecting to the network by using the data communication function of the cellular phone to make data communications, wherein, when a message frame which is an error frame having a different CRC code portion is received from the radio base station, the cellular phone takes out and stores the data contained in the message frame and reproduces the thus stored data to output the data.

According to this invention having the feature as described above, when the user executes the data communication from the terminal by utilizing the data communication function of the cellular phone, the delivery side transmits, being mixed in the data exchanged in a unit of a frame, a message frame which is an error frame capable of correcting error and is irrelevant to the data communication by differing the CRC code by a particular operation such as bit inversion. The cellular phone detects the message frame, takes out the data contained in the message frame and stores the data, and displays the stored data as character information or picture information on the display screen. Or, the stored data are reproduced from a sound source as audio information. Thus, data such as advertisement can be delivered. That is, the data such as advertisement is delivered while the user executes the data communication. The message frame is simply an error frame when it is viewed from the normal data communication. When the data is received by a cellular phone to which this invention is not adapted, therefore, a request is issued for transmitting the data again. Namely, the delivery side transmits again the frame without data in response to the request for transmitting the message frame again, without affecting the data exchanged by the normal data communication.

BRIEF DESCRIPTION OF THE DRAWINGS

FIG. 2 is a diagram illustrating a frame constitution of the PDC system in a digital cellular phone;

FIG. 3 is a diagram illustrating a frame constitution of the PIAFS system in a PHS;

FIG. 4 is a diagram illustrating a data frame constitution used for explaining the data communications in the data communication system utilizing the cellular phone of this invention;

FIG. 5 is a diagram illustrating a data frame constitution used for explaining the data communications in the data communication system by utilizing the cellular phone of this invention;

FIG. 6 is a diagram illustrating a data frame constitution used for explaining the data communications in the data communication system by utilizing the cellular phone of this invention;

DESCRIPTION OF THE PREFERRED EMBODIMENTS

Figure 1:
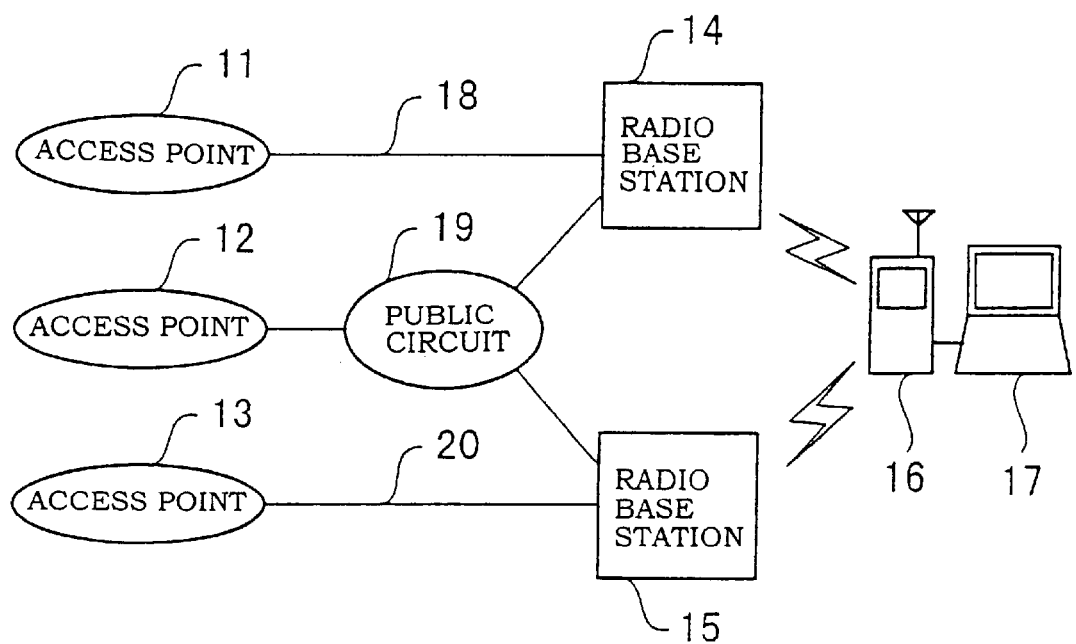
FIG. 1 is a block diagram illustrating a data communication system by utilizing a cellular phone according to the present invention.

It is an object of this invention to provide a data communication system utilizing a cellular phone, which allows to reliably display a message such as advertisement on the individual's cellular phones without calling the individual's cellular phones from the delivery side, and which does not cause mismatching with the conventional data communication and does not cause inconvenience to the existing data communication.

The invention further provides a data communication system utilizing a cellular phone in which whether the frame that is transmitted is a message frame or a normal data frame is discriminated prior to flowing it to the terminal, without requiring any processing associated with the message frame on the terminal side. The invention still further provides a data communication system utilizing a cellular phone in which whether the frame that is transmitted is a message frame or a normal data frame is discriminated upon receiving a frame for requesting the retransmission from the terminal side, without requiring any processing associated with the message frame on the terminal side.

The invention further provides a data communication system utilizing a cellular phone which is capable of delivering a message at regular time intervals during the data communication irrespective of whether an access point is connected to a general circuit or to a direct circuit. The invention further provides a data communication system utilizing a cellular phone which is capable of delivering a message in an idle time by detecting a communication idle time in which no effective data is transmitted to the terminal during the data communication irrespective of whether an access point is connected to a general circuit or to a direct circuit.

The invention further provides a data communication system utilizing a cellular phone which is capable of delivering a message at regular time intervals during the data communication when an access point is connected to a direct circuit even though the radio base station is a conventional one. The invention further provides a data communication system utilizing a cellular phone which is capable of delivering a message in an idle time by detecting a communication idle time in which no effective data is transmitted to the terminal during the data communication when an access point is connected to a direct circuit even though the radio base station is a conventional one.

The invention further provides a data communication system utilizing a cellular phone which enables the delivery side to grasp how much message was delivered.

In the data communication system utilizing the cellular phone of this invention, the cellular phone detects the message frame in which the CRC code is differed by a particular operation before it is sent to the terminal, reconstructs the CRC code by a particular operation to confirm data error, takes out correct data contained in the message frame, stores the data, reproduces the stored data, and outputs the data.

According to this invention having the features mentioned above, the cellular phone monitors the frame transmitted from the radio base station and checks the CRC code to detect the message frame. Then, the cellular phone takes out the data contained in the message frame and stores it in a memory therein, does not flow the message frame to the terminal but flows the frame without data. Thereby, the data exchanged by the conventional data communication is not at all affected. At a moment when the data stored in the memory in the cellular phone builds up as one data, the data is displayed as character information or picture information on the display screen of the cellular phone. Or, the data is reproduced from a sound source as audio information.

In the data communication system utilizing the cellular phone of this invention, the cellular phone detects the message frame in which the CRC code is differed by a particular operation upon receiving from the terminal a control frame that requests the retransmission, reconstructs the CRC code by a particular operation to check for data error, takes out correct data contained in the message frame and reproduces the stored data to output the data.

According to this invention having the above feature, the cellular phone holds the frame sent from the radio base station for a predetermined period of time, and checks the CRC code in the relevant frame that is being held based upon the request for retransmission sent from the terminal in order to detect the message frame. Then, the cellular phone takes out the data contained in the message frame and stores it in a memory therein, sends a normal reception frame to the radio base station, and flows a frame without data as a retransmission frame to the terminal. Therefore, the data exchanged by the conventional data communication is not at all affected. At a moment when the data stored in the memory in the cellular phone builds up as one data, the data is displayed as character information or picture information on the display screen of the cellular phone. Or, the data is reproduced from a sound source as audio information.

In the data communication system utilizing the cellular phone of this invention, further, the radio base station has a function of mixing, at regular time intervals, the message frame into the normal data frame transmitted to the cellular phone.

According to this invention having the above feature, data such as advertisement is delivered to the cellular phone by transmitting the message frame at regular time intervals instead of transmitting the data frame at the time of transmitting the frame from the radio base station to the cellular phone, irrespective of whether an access point is connected to the radio base station through a general circuit or a direct circuit. In this case, the message frame is necessarily transmitted irrespective of the data amount in the data communication, and the data is reliably delivered though the effective speed of data communication decreases slightly. Here, the connection through the direct circuit is a system of connection from the radio communication network through a dedicated line without passing through analog circuit and, hence, realizing digital communications. When the connection is made to the general circuit, processing is effected such as dividing the frame of data using a protocol converter between the radio base station and the general circuit network. In the case of the direct connection, however, the protocol conversion must be executed at the access point to match with the protocol of radio communication network.

In the data communication system utilizing the cellular phone of this invention, further, the radio base station has a function of replacing a data frame without containing effective data by the message frame when no effective data is detected in the normal data frame transmitted to the cellular phone.

According to this invention having the above feature, data such as advertisement is delivered to the cellular phone by transmitting the message frame instead of the data frame when it is detected that no effective data is contained in the data frame while monitoring the data frame at the time of transmitting the frame from the radio base station to the cellular phone, irrespective of whether an access point is connected to the radio base station through a general circuit or a direct circuit. In this case, the message frame is transmitted during the idle time in which no data is transmitted, and the effective speed of data communication does not decrease.

In the data communication system utilizing the cellular phone of this invention, further, an access point is connected to the radio base station through the direct circuit, the access point having a function of mixing, at regular time intervals, the message frame into the normal data frame transmitted to the cellular phone.

According to this invention having the above feature, when the access point is connected to the direct circuit (connected to the ISDN network in the case of PHS), data such as advertisement is delivered to the cellular phone by transmitting, at regular time intervals, the message frame instead of the data frame from the access point prior to transmitting the frame to the cellular phone through the radio base station even when the radio base station does not have a function of transmitting the message frames. In this case, the message frame is necessarily transmitted irrespective of the data amount in the data communication, and the data is reliably delivered though the effective speed of data communication slightly decreases.

In the data communication system utilizing the cellular phone of this invention, further, an access point is connected to the radio base station through the direct circuit when no effective data is detected in the normal data frame that is transmitted to the cellular phone, the access point having a function of replacing the data frame without containing effective data by the message frame.

According to this invention having the above feature, when the access point is connected to the direct circuit (connected to the ISDN network in the case of PHS), data such as advertisement is delivered to the cellular phone by transmitting the message frame instead of the data frame when no effective data is detected in the data frame while monitoring the data frame transmitted from the access point prior to transmitting the frame to the cellular phone through the radio base station even when the radio base station does not have a function of transmitting the message frames. In this case, the message frame is transmitted during the idle time in which no data is transmitted, and the effective speed of data communication does not decrease.

In the data communication system utilizing the cellular phone of this invention, further, the cellular phone does not request the message frame to be transmitted again when the message frame is properly detected, and the radio base station has a function of counting the number of the delivered message frames by confirming through the presence of request for retransmission whether the cellular phone has properly detected the message frame. Further, the cellular phone does not request the message frame to be transmitted again when it has properly detected the message frame, and the access point has a function of counting the number of the delivered message frames by confirming through the presence of request for retransmission whether the cellular phone has properly detected the message frame.

According to this invention having the above feature, the access point that has transmitted the message frame or the radio base station monitors the request from the cellular phone for transmitting the message frame again. When no request for retransmission is received, it is judged that the cellular phone has properly processed the message frame. On the other hand, when the request for retransmission is received, it is judged that the cellular phone has not processed the message frame or the message frame was not properly transmitted to the cellular phone due to some abnormal condition in the communication. At a moment when the message frames are transmitted by an amount of one data, further, the data is certainly displayed on the screen of the cellular phone or is reproduced from the sound source in the cellular phone. That is, how much message was delivered to the cellular phone is grasped on the delivery side.

Embodiments of the invention will now be described with reference to the drawings.

FIG. 1 shows one example of a data communication system to which the invention is applied.

In FIG. 1, reference numerals 11 to 13 denote access points where an ISP (internet service provider) or the like is installed. The access point 11 is connected to a radio base station of a digital cellular phone through a direct circuit 18. The access point 12 is connected to a public circuit 19, and the access point 13 is connected to an ISDN network 20.

Reference numerals 14 and 15 denote radio base stations where a communication carrier is installed, the radio base station 14 being connected to the public circuit 19 and to the direct circuit 18, and the radio base station 15 being connected to the ISDN network 20.

The access points 11, 12, 13 and the radio base stations 14, 15 represent the message delivery side, and transmit messages stored in the server to a cellular phone 16.

Figure 7:
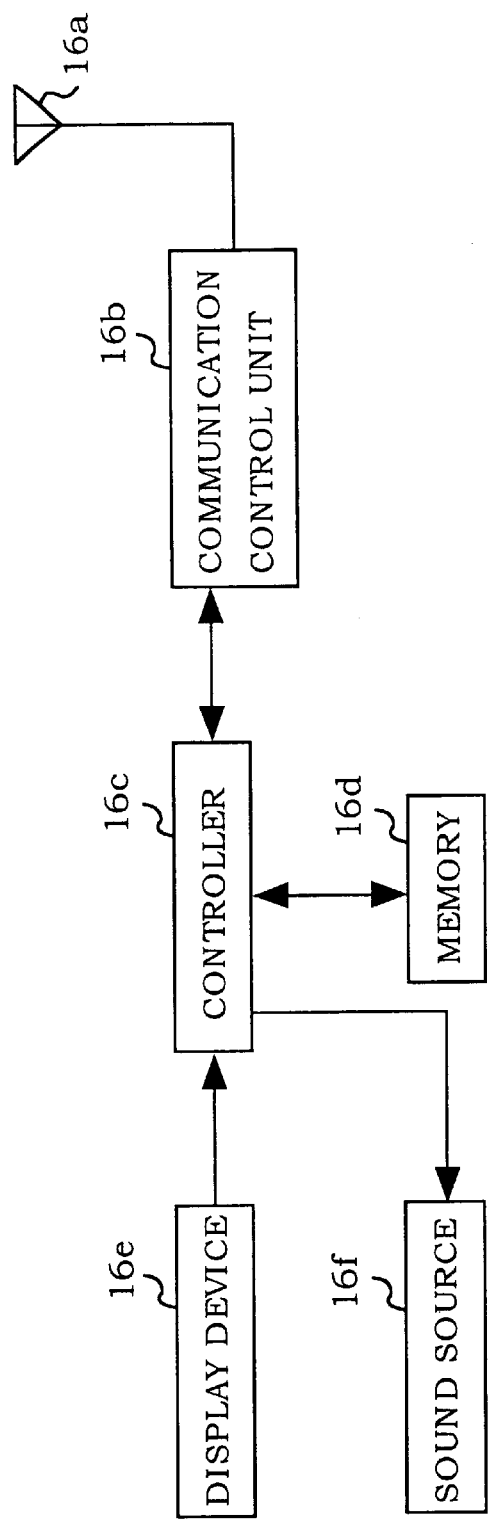
FIG. 7 is a block diagram illustrating a constitution of the cellular phone in the data communication system by utilizing the cellular phone of this invention.

The cellular phone 16 has a data communication function and has an internal structure as shown in FIG. 7. That is, the cellular phone 16 includes a communication control unit 16b having an antenna 16a for executing data communication with the radio base stations 14, 15, a controller 16c for controlling the whole cellular phone 16, a memory 16d for storing message frames, a liquid crystal display device 16e for displaying advertisement and the like, and a sound source 16f for producing audio information of advertisement. Reference numeral 17 denotes a terminal that connects to the network by using the data communication function of the cellular phone 16 to execute the data communication.

In this embodiment, the cellular phone 16 and the data communication terminal 17 have been separated from each other. However, the cellular phone 16 and the data communication terminal 17 may have been integrally combined together.

In the thus constituted data communication system, the terminal 17 is connected to the internet through the cellular phone 16; i.e., the terminal 17 calls the access points 11 to 13 of the ISP through the cellular phone 16.

When the cellular phone 16 is a digital phone, the access point will be the one 11 or the one 12 through the protocol converter. When the cellular phone 16 is a PHS, the access point will be the one 13 or the one 12 through the protocol converter.

When the telephone circuit is connected between the cellular phone 16 and the access points 11 to 13, the data communications are brought into synchronism, and the data communications are commenced after the synchronism is established.

During the data communications, the data are exchanged by frames as shown in FIG. 2 in the case of the PDC system and by frames as shown in FIG. 3 in the case of the PIAFS system.

Referring to FIG. 2 illustrating the frame constitution of the PDC system, a backward channel control data is a region including a retransmission frame number, a forward channel control data is a region including a transmission frame number, and a forward channel data is a region including user data. Regions CRC 16 and CRC-CCITT are used for detecting errors in the frame.

Referring to FIG. 3 illustrating the frame constitution of the PIAFS system, F1 denotes a kind-of-frame identifier, FFI denotes a frame number and FBI denotes a number of the requested frame. A frame continuation discrimination bit is used for discriminating the continuation of the frame. The data length is a number of bytes of significant data present in the user data region, and the user data is an effective data portion. CRC 32 is for detecting an error in the frame.

In any case, when an error is detected by the CRC code, the number of the frame to be transmitted again is designated by the backward channel control data or by FBI, and the frame containing error is transmitted again to correct the error.

These frame constitutions can be roughly grouped to be as shown in FIG. 4. That is, ARQ control data is a portion including the transmission frame number and the retransmission frame number, the data is a portion including the effective data, and the CRC codes thereof are attached to the CRC.

In the frame shown in FIG. 4, the CRC code at the end is differed from the CRC code in the normal data communication by a particular operation such as bit inversion, and this error frame is used as the message frame (see FIG. 5). Here, the method of changing the CRC code to convert the normal data frame into the message frame is not limited to the bit inversion but may be a reversible operation for mutually converting them, and the bit inversion is one of the examples.

Further, an example of message data transmitted by the message frame in this embodiment may be a format of which the end is detectable as shown in FIG. 6.

That is, the kind of data is a symbol for identifying whether the message data is character information, picture information or audio information. The data length 1 represents the length of data 1 that follows. When the data amount of message data exceeds a maximum value represented by a data length, the data length 2 and the data 2 immediately follow the data 1, which are, then, repeated until the data in the whole message data are settled. At the end of all data, i.e., at the data length n+1, a symbol of data end is indicated instead of the data length.

The message data is divided into a data field size of message frame and is sent successively at the time of transmitting the message frame.

Figure 8:
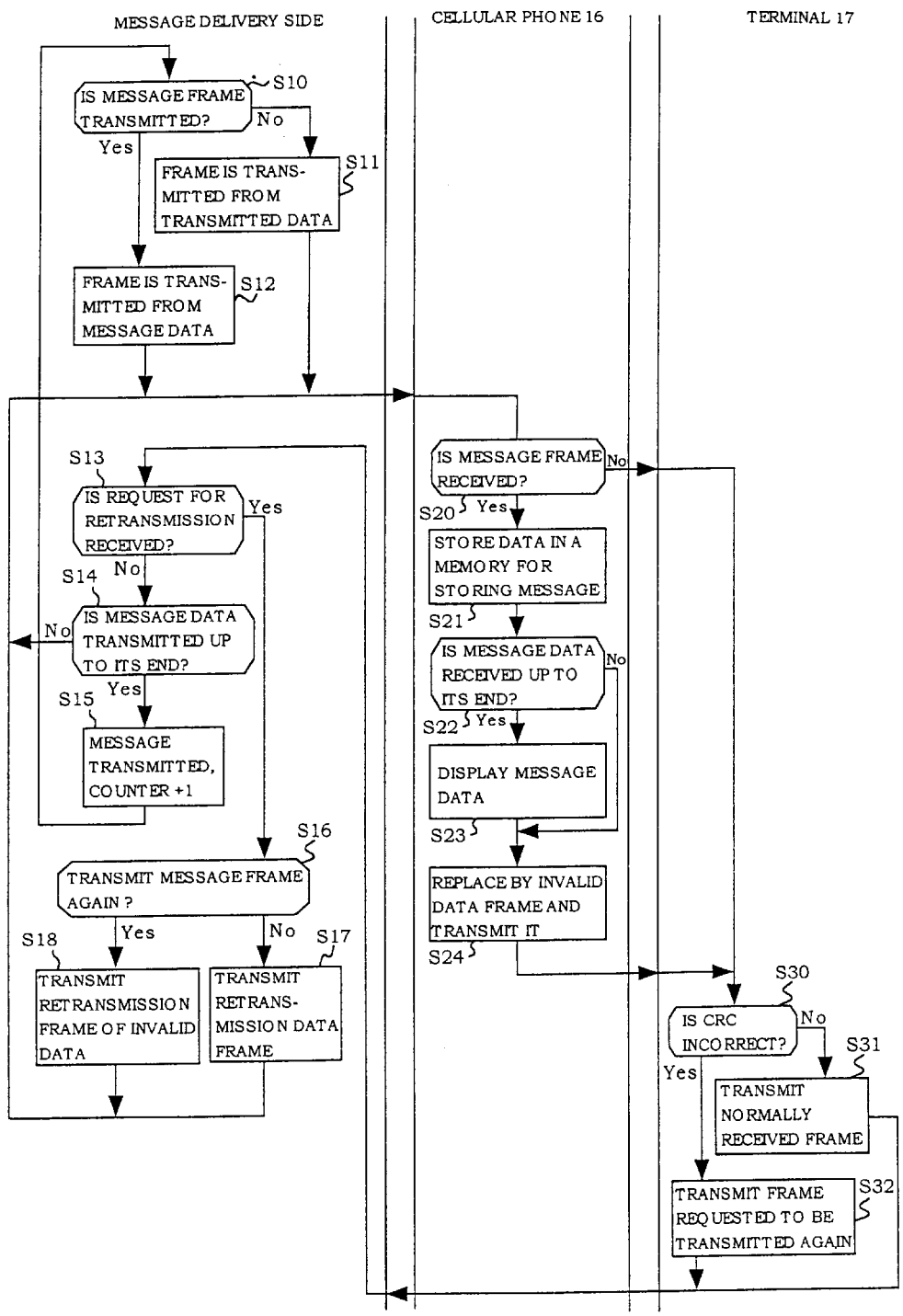
FIG. 8 is a flowchart illustrating the communication operation in the data communication system by utilizing the cellular phone of this invention.

The processing operation of the data communication system according to the embodiment will be described below with reference to a flowchart shown in FIG. 8.

During the data communication, the data are exchanged in a unit of the above-mentioned frame between the cellular phone 16 and the radio base stations 14, 15 which are on the message delivery side. When it is judged at step S10 that a message frame is transmitted, the routine proceeds to step S11, and the message frame is transmitted being mingled in the normal data frame to the cellular phone 16 from the radio base stations 14 and 15.

At step S20, the cellular phone 16 detects a frame that has, in the CRC code field, a value obtained by inverting the bit of a normal CRC code and interprets it as the message frame. When no message frame is detected at step S20, on the other hand, the frame is simply transmitted to the terminal 17.

The cellular phone 16 which has detected the message frame at step S20 proceeds the routine to step S21 and stores the data field of the message frame in the memory 16d.

Next, when it is judged at step S22 that the data are stored in the memory 16d up to the end of the message data, the routine proceeds to step S23 where the stored data are produced as message data. The message is displayed on the screen of the display device 16e depending upon the kind of the message data, i.e., displayed when the message data is character information or picture information. The message data is reproduced from the sound source 16f when it is the audio information. Here, a buzzer or the like may be used to let the user of the cellular phone 16 know the arrival of message.

When the data field of message frame is stored in the memory 16d, the cellular phone 16 rewrites at step S24 the message frame into a data frame without containing effective data and transmits it to the terminal 17. Then, the terminal 17 judges at step S30 that the message frame is a normal frame without data and informs the radio base stations of the normal reception thereof. Here, since no effective data is contained, the data received by the preceding and succeeding reception frames are not at all affected.

When the cellular phone 16 is the one that does not meet the invention (i.e., is the one that meets normal data communication), the terminal 17 detects at step S20 a CRC error from the message frame, proceeds the routine to step S32 to send the request for retransmission to the radio base stations 14 and 15.

Even in case the data in the message frame becomes garbled due to noise, the cellular phone 16 converts the CRC code into a normal CRC code to judge the message frame. Therefore, the message frame in which the data is garbled is not interpreted to be the message frame. Like when the message frame is transmitted to the cellular phone that does not meet the invention, therefore, the request for retransmission is sent at step S32 from the terminal 17 to the radio base stations 14 and 15.

The radio base stations 14 and 15 which have normally received the message frame at step S13, then, proceed the routine to step S14. When the message data is transmitted up to the end (when the answer is "yes" at step S14), the counter that counts the number of the transmitted messages is increased by +1 (step S15), and a next message data is prepared.

When the message data has not been transmitted up to the end at step S14 (when the answer is "no"), a next message frame in the same message data is transmitted at the time of transmitting the next message frame.

On the other hand, when the radio base stations 14 and 15 have received the request for retransmission at step S13, it is judged at step S16 whether the request for retransmission is for retransmitting the message frame. When it is the request for retransmitting the message frame (when the answer is "yes" at step S13), the routine proceeds to step S18 where an invalid data frame without containing effective data in the data field is transmitted as a retransmission frame, and the invalid data frame is retransmitted for the above frame until the normal data frame is received. At step S16, on the other hand, when it is not the request for retransmitting the message frame (when the answer is "no" at step S16), the routine proceeds to step S17 and the message frame same as the preceding one is transmitted at the time of transmitting the message frame next time.

Hereinafter, the above-mentioned operations are repeated until the data communication ends.

Owing to the above-mentioned constitution, messages such as advertisements can be reliably displayed on the individual's cellular phones 16 without the need of calling the individual's cellular phones from the delivery side yet guaranteeing data communication without causing inconvenience to the existing data communication that results from the mismatching with the existing data communication.

Figure 9:
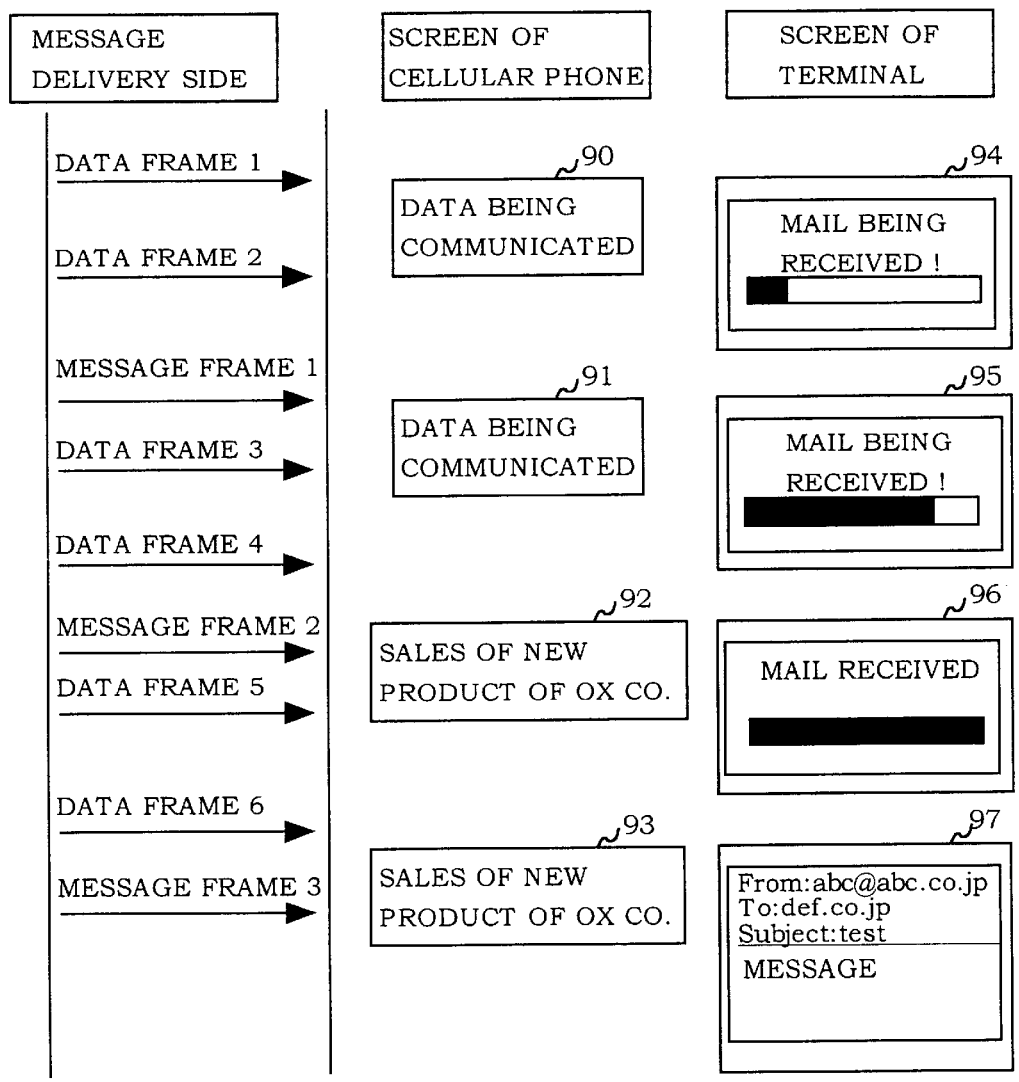
FIG. 9 is a diagram illustrating examples of display on the screen in the data communication system by utilizing the cellular phone of this invention.

FIG. 9 illustrates examples of screen display of the cellular phone 16 and of the terminal 17 by way of example. In FIG. 9, the terminal 17 is down-loading the received mail from the mail server. The message data is a message of character sequence "SALES OF A NEW PRODUCT OF OX CO." which is divided into two message frames, and a message frame is transmitted after every two data frames.

When the data frames 1 and 2 are being received, the display screen of the cellular phone 16 produces an initial display at the start of communication like a screen 90. On the screen of the terminal 17, a bar representing the amount of the received data grows as the received mail is progressively down-loaded as represented by a screen 94.

When the message frame 1 is being received, the initial display is maintained produced on the display screen of the cellular phone 16 like a screen 91, since the message data has not been received up to the end thereof.

When the data frames 3 and 4 are being received, a bar representing the amount of the received data grows on the screen of the terminal 17 as represented by the screen 95. The display screen of the cellular phone 16 remains unchanged as represented by the screen 91.

When the message frame 2 is being received, the display screen of the cellular phone 16 displays the message data that is received as represented by a screen 92, since the message data has been received up to the end thereof.

When the data frames 5 and 6 are being received, the down-loading of mail has been finished, and the screen of the terminal 17 displays the received mail as represented by a screen 97 passing through a screen 96. The display screen of the cellular phone 16 remains unchanged as represented by the screen 92.

When the message frame 3 is being received, a new message data has not been received up to the end thereof yet. Therefore, the display screen of the cellular phone 16 displays the message data that has been received already as represented by a screen 93.

Thereafter, the display of the message data is held until the new message data is received up to the end thereof.

In the foregoing was described the basic processing operation of the data communication system according to the embodiment. Concrete examples will now be described below.

EXAMPLE 1

The cellular phone 16 according to this Example 1 calculates a CRC code at the end of the data frame prior to flowing the data frame transmitted from the radio base stations 14 and 15 during the data communication to the terminal 17. Then, the data frame is judged to be the message frame when the data frame has the above calculated CRC code of which the bit is inverted in the CRC code field. When the message frame is thus detected, the cellular phone 16 stores the data field of message frame in the memory 16*d*. When the message frame is flown to the terminal 17, at this moment, the terminal 17 certainly sends back the request for retransmission. When the message frame is detected, therefore, the cellular phone 16 does not flow the message frame to the terminal 17 but calculates the CRC code while holding the ARQ data of the message frame and rendering the data field to contain no data, and flows a frame in which the CRC code is exchanged. When the message frame is not detected, the cellular phone 16 simply flows the frame to the terminal 17.

In response to the thus replaced data frame, the terminal 17 sends back the normal reception and, hence, the treatment related to the message frame normally ends.

When the data of message frame stored in the memory 16*d* ends as a format of message data (i.e., when the data stored in the memory 16*d* builds up as a piece of data), the cellular phone 16 produces a display depending upon the kind of the message data, i.e., produces a display on the display screen 16*e* when the message data is a character information or a picture information, and reproduces the message data from the sound source 16*f* when the message data is a audio information.

As described above, the message data is stored in the memory 16*d*, and the stored data is displayed on the display screen as character information or picture information, or is reproduced from the sound source 16*f* as audio information without affecting the data communication.

EXAMPLE 2

The cellular phone 16 of Example 2 once stores the data frame transmitted from the radio base stations 14 and 15 in the memory 16*d* during the data communication, and simply flows the data frame to the terminal 17.

The cellular phone 16 monitors the echo from the terminal 17 for the received data, erases the normally received frame stored in the memory 16*d* when the normal reception is sent back, and transmits the normal reception to the radio base stations 14 and 15.

When the echo from the terminal 17 is a request for retransmission, the frame that is stored in the memory 16*d* and is requested to be transmitted again, is called, and a CRC code is calculated. Then the frame that is called is judged to be the message frame when it has the calculated CRC code of which the bit has been inverted in the CRC code field. When the frame is not the message frame, the request for retransmission is simply flown to the radio base stations 14 and 15.

When the message frame is detected, the cellular phone 16 stores the data field of the message frame in the memory 16d.

When the message frame is detected, the cellular phone 16 does not transmit the request for retransmission to the radio base stations but transmits the normal reception.

Then, in response to the request for retransmitting the message frame, the cellular phone 16 calculates the CRC code while holding the ARQ data of the message frame and rendering the data field to contain no data, and flows a frame in which the CRC code is replaced to the terminal 17 as the retransmitted data.

In response to the thus replaced data frame, the terminal 17 sends back the normal reception. In this case, the cellular phone 16 does not transmit the normal reception to the radio base stations 14 and 15 and, hence, the treatment related to the message frame normally ends.

When the data of message frame stored in the memory 16d ends as a format of message data (i.e., when the data stored in the memory 16d builds up as a piece of data), the cellular phone 16 produces a display depending upon the kind of the message data, i.e., produces a display on the display screen 16e when the message data is a character information or a picture information, and reproduces the message data from the sound source 16f when the message data is a audio information.

As described above, the message data is stored in the memory 16d, and the stored data is displayed on the display screen as character information or picture information, or is reproduced from the sound source 16f as audio information without affecting the data communication.

EXAMPLE 3

In Example 3, the counter is set to 0 at the radio base stations 14 and 15 at the time of commencing the data communication. Then, the counter is increased by +1 every time when the frame is transmitted to the cellular phone 16. At a moment when the value of the counter has exceeded a predetermined number, the message frame is transmitted instead of transmitting the data frame at the next time of frame transmission, and the counter is set to 0.

When the radio base stations 14 and 15 have received normal reception for the message frame, the treatment related to the message frame normally ends, and a next message frame is transmitted at the time when the message frame is to be transmitted next time.

When the radio base stations 14 and 15 have received a request for transmitting the message frame again, the data frame without containing effective data in the data field is transmitted as the retransmission frame. The data frame is transmitted again until the normal reception is informed.

When the radio base stations 14 and 15 have no request for transmitting the message frame again, the message frame same as that of the preceding time is transmitted at the time of transmitting the message frame next time.

The above operations are hereinafter repeated until the message data are all transmitted.

As described above, the radio base stations 14 and 15 transmit message frames, and data such as advertisement is delivered to the cellular phone 16 irrespective of whether the access points 11 to 13 are connected to the radio base stations 14 and 15 through a general circuit or a direct circuit 18. By using the counter which counts the number of the transmitted frames, further, the message frames can be transmitted at regular time intervals.

EXAMPLE 4

In this Example 4, the radio base stations 14 and 15 monitor the data frames during the data communication, and transmit a message frame instead of the data frame when it is detected, at the time of transmitting the frame, that the data frame contains no effective data. When the radio base stations 14 and 15 are informed of normal reception of the message frame, the treatment concerning the message frame normally ends. The radio base stations 14 and 15 transmit a next message frame at the time of transmitting the message frame next time.

On the other hand, when a request for transmitting the message frame again is received, the radio base stations 14 and 15 transmit, as a retransmission frame, the data frame without containing effective data in the data field, and transmits this data frame again until the normal reception is informed.

When the request for transmitting the message frame again is not received, the radio base stations 14 and 15 transmit the message frame same as the preceding message frame at the time of transmitting the message frame next time.

The above operation is hereinafter repeated until the message data are all transmitted.

As described above, the radio base stations 14 and 15 transmit message frames, and data such as advertisement is delivered to the cellular phone 16 irrespective of whether the access points 11 to 13 are connected to the radio base stations 14 and 15 through a public circuit or a direct circuit 18. By transmitting the message frame during the idle time of communication in which no effective data is contained in the data frame, further, the message can be delivered without decreasing the effective speed of the normal data communication.

EXAMPLE 5

In Example 5, when the access points 11 and 13 are connected to the direct circuit 18 (connected to the ISDN network 20 in the case of PHS), the counter is set to 0 at the time of commencing the data communication. The counter is increased by +1 every time when the frame is transmitted to the cellular phone 16. At a moment when the value of the counter has exceeded a predetermined number, a message frame is transmitted instead of the data frame at the time of transmitting the frame next, and the counter is set to 0.

When the normal reception for the message frame is informed, the treatment related to the message frame normally ends, and the access points 11 and 13 transmit a next message frame at the time of transmitting the message frame next time.

When a request for transmitting the message frame again is received, the access points 11 and 13 transmit, as a retransmission frame, the data frame without containing effective data in the data field. The data frame is transmitted again until the normal reception is informed.

When the request for transmitting the message frame again is not received, the access points 11 and 13 transmit the message frame same as the preceding message frame at the time of transmitting the message frame next time.

The above operations are hereinafter repeated until the message data are all transmitted.

By transmitting the message frames from the access points 11 and 13 as described above, the data such as advertisement can be delivered to the cellular phone 16 even when the radio base stations 14 and 15 have no function for transmitting message frames. By using the counter that counts the number of the transmitted frames, further, the message frames can be transmitted at regular time intervals.

EXAMPLE 6

In Example 6, the access points 11 and 13 monitor the transmission data during the data communication and transmit the message frame to the cellular phone 16 when it is detected that there is no data to be transmitted.

When the normal reception for the message frame is informed, the treatment related to the message frame normally ends, and the access points 11 and 13 transmit a next message frame at the time of transmitting the message frame next time.

When a request for transmitting the message frame again is received, the access points 11 and 13 transmit, as a retransmission frame, the data frame without containing effective data in the data field. The data frame is transmitted again until the normal reception is informed.

When the request for transmitting the message frame again is not received, the access points 11 and 13 transmit the message frame same as the preceding message frame at the time of transmitting the message frame next time.

The above operations are hereinafter repeated until the message data are all transmitted.

By transmitting the message frames from the access points 11 and 13 as described above, the data such as advertisement can be delivered to the cellular phone 16 even when the radio base stations 14 and 15 have no function for transmitting message frames. Further, by transmitting message frames in the idle time of communication in which effective data is not contained in the data frame, it is allowed to deliver the messages without decreasing the effective speed of normal data communication.

EXAMPLE 7

In Example 7, the counter is set to 0 at the access points 11 and 13 that transmit message frames or at the radio base stations 14 and 15 at the time of commencing the data communication.

After the message frame has been transmitted, the access points 11 and 13 or the radio base stations 14 and 15 monitor the response of the cellular phone 16 for the message frame. When a normal reception is informed, it is so judged that the cellular phone 16 has properly processed the message frame, and a next message frame is transmitted at the time of transmitting the message frame next time.

After the message frame is transmitted by an amount of a piece of message data, the counter is increased by +1.

When a request for retransmission is received, it is so judged that the cellular phone 16 has not processed the message frame or the message frame has not been properly transmitted to the cellular phone 16 due to some abnormal condition in the communication, and the message frame same as the preceding message frame is transmitted at the time of transmitting the message frame next time.

A value exhibited by the counter at the time when the data communication has finished represents a frequency of data such as advertisement delivered to the cellular phone 16 during the data communication. This makes it possible, for example, to discount the communication fees depending upon the frequency of advertisement.

According to the data communication system utilizing a cellular phone of the invention, a message frame to which is added a CRC code different from the normal one is transmitted to the cellular phone during the data communication by using the cellular phone, and data such as advertisement is displayed on the display screen of the cellular phone that has detected the message frame. The message data is provided with the CRC code different from that of the normal data frame and does not cause mismatching with the normal data communication. Therefore, there is provided the data communication system free from inconvenience even when it is used in the existing data communication.

According to the data communication system utilizing a cellular phone of the invention, further, the cellular phone processes the message frame before the message frame flows to the terminal. Therefore, the terminal does not have to execute any processing in relation to the message frame, and the existing equipment can be used. Besides, the transmission of the message frame does not involve retransmission suppressing a drop in the effective speed of communication.

According to the data communication system utilizing a cellular phone of the invention, further, the request from the terminal for transmitting the message frame again is detected and processed by the cellular phone. Therefore, the terminal does not have to execute any processing in relation to the message frame, and the existing equipment can be used. Besides, the cellular phone needs bear a decreased burden of processing compared with when it is judged, at all times, whether the frame that is received is a message frame. Therefore, the cellular phone to which the invention is applied needs satisfy decreased amounts of specifications, which is advantageous from the standpoints of battery capacity for sustaining the communication and the cost.

According to the data communication system utilizing a cellular phone of the invention, further, the message frames are transmitted from the radio base stations at regular time intervals, and the data such as advertisement can be delivered during the data communication irrespective of whether the access points are connected to a general circuit or to a direct circuit 18. Besides, since the message frames are certainly transmitted at regular time intervals, the data is reliably delivered though the efficient speed of data communication slightly decreases.

According to the data communication system utilizing a cellular phone of the invention, further, the message frames are transmitted from the radio base stations in an idle time of communication in which no data is transmitted, and the data such as advertisement can be delivered during the data communication irrespective of whether the access points are connected to the general circuit or to the direct circuit 18. Further, the message frames are transmitted in an idle time of communication in which no data is transmitted, and the effective speed of normal data communication does not decrease.

According to the data communication system utilizing a cellular phone of the invention, further, the access points connected to the direct circuit 18 (connected to the ISDN network 20 in the case of the PHS) transmit message frames even when the radio base stations do not have a function of transmitting message frames, making it possible to deliver the data such as advertisement during the data communication. Further, since the message frames are necessarily transmitted at regular time intervals, the data can be reliably delivered though the effective speed of data communication slightly decreases.

According to the data communication system utilizing a cellular phone of the invention, further, the access points connected to the direct circuit 18 (connected to the ISDN network 20 in the case of the PHS) transmit message frames in the idle time of communication in which no data is transmitted, even when the radio base stations do not have a function of transmitting message frames, making it possible to deliver the data such as advertisement during the data communication. Further, since the message frames are transmitted during the idle time of communication in which no data is transmitted, the effective speed of normal data communication does not decrease.

According to the data communication system utilizing a cellular phone of the invention, further, it is allowed to grasp on the delivery side how much message was delivered to the cellular phone. This makes it possible to realize a service such as discounting the communication fees depending upon the frequency of advertisement.

What is claimed is:

1. A data communication system utilizing a cellular phone, comprising:
   a radio base station,
   a cellular phone having a function of connecting to a network through radio communications with the radio base station to make data communications accompanied by error control using a cyclic redundancy code (CRC), and
   a terminal connecting to the network by using the data communication function of the cellular phone to make data communications,
   wherein, when a message frame which is an error frame having a different CRC code from a normal data communication is received from the radio base station, the cellular phone takes out and stores the data contained in the message frame without transmitting the data to the terminal and reproduces the thus stored data to output the data.

2. A data communication system utilizing a cellular phone according to claim 1, wherein the radio base station forms a message frame in which the CRC code contained in the data to be transmitted to the cellular phone is differed by a particular operation and transmits the message frame to the cellular phone, and the cellular phone detects the received message frame before delivering it to the terminal and reconstructs the CRC code by a particular operation to confirm an error in the data, thereby to take out and store correct data contained in the message frame and to reproduce the stored data to output the data.

3. A data communication system utilizing a cellular phone according to claim 1, wherein the cellular phone detects the message frame containing the CRC code differed by a particular operation upon receiving from the terminal a control frame that requests the retransmission and reconstructs the CRC code by a particular operation to confirm an error in the data, thereby to take out and store correct data contained in the message frame and to reproduce the stored data to output the data.

4. A data communication system utilizing a cellular phone according to claim 1, 2 or 3, wherein the radio base station has a function of mixing, at regular time intervals, the message frames into normal data frames that are transmitted to the cellular phone.

5. A data communication system utilizing a cellular phone according to claim 1, 2 or 3, wherein, when no effective data is detected in the normal data frame transmitted to the cellular phone, the radio base station replaces the data frame without containing effective data by the message frame.

6. A data communication system utilizing a cellular phone according to claim 4, wherein the cellular phone is set so as not to request the retransmission of message frame when the message frame is properly detected, and the radio base station has a function of counting the number of the delivered message frames by confirming through the presence of request for retransmission whether the cellular phone has properly detected the message frame.

7. A data communication system utilizing a cellular phone according to claim 5, wherein the cellular phone is set so as not to request the retransmission of message frame when the message frame is properly detected, and the radio base station has a function of counting the number of the delivered message frames by confirming through the presence of request for retransmission whether the cellular phone has properly detected the message frame.

8. A data communication system utilizing cellular phone according to claim 1, 2 or 3, wherein an access point having a function of mixing, at regular time intervals, the message frames into the normal data frames transmitted to the cellular phone is connected to the radio base station through a direct circuit.

9. A data communication system utilizing cellular phone according to claim 1, 2 or 3, wherein, when no effective data is detected in the normal data frame transmitted to the cellular phone, an access point having a function of replacing the data frame without containing effective data by the message frame is connected to the radio base station through a direct circuit.

10. A data communication system utilizing a cellular phone according to claim 8, wherein the cellular phone is set so as not to request the retransmission of message frame when the message frame is properly detected, and the access point has a function of counting the number of the delivered message frames by confirming through the presence of request for retransmission whether the cellular phone has properly detected the message frame.

11. A data communication system utilizing a cellular phone according to claim 9, wherein the cellular phone is set so as not to request the retransmission of message frame when the message frame is properly detected, and the access point has a function of counting the number of the delivered message frames by confirming through the presence of request for retransmission whether the cellular phone has properly detected the message frame.

* * * * *